(12) United States Patent
Yonemaru et al.

(10) Patent No.: US 11,048,071 B2
(45) Date of Patent: Jun. 29, 2021

(54) MICROSCOPE OBJECTIVE

(71) Applicant: OLYMPUS CORPORATION, Hachioji (JP)

(72) Inventors: Yasuo Yonemaru, Tokyo (JP); Kengo Osawa, Kamiina (JP)

(73) Assignee: OLYMPUS CORPORATION, Tokyo (JP)

( * ) Notice: Subject to any disclaimer, the term of this patent is extended or adjusted under 35 U.S.C. 154(b) by 39 days.

(21) Appl. No.: 16/378,996

(22) Filed: Apr. 9, 2019

(65) Prior Publication Data

US 2019/0324251 A1 Oct. 24, 2019

(30) Foreign Application Priority Data

Apr. 19, 2018 (JP) .............................. JP2018-080949

(51) Int. Cl.
*G02B 21/02* (2006.01)
*G02B 9/06* (2006.01)

(52) U.S. Cl.
CPC ............... *G02B 21/02* (2013.01); *G02B 9/06* (2013.01)

(58) Field of Classification Search
CPC .............................. G02B 21/02; G02B 21/025
USPC ................................................. 359/656–661
See application file for complete search history.

(56) References Cited

U.S. PATENT DOCUMENTS

| 2006/0056039 | A1* | 3/2006 | Sakakura | G02B 21/02 |
| | | | | 359/656 |
| 2010/0177404 | A1 | 7/2010 | Fujimoto | |
| 2021/0011268 | A1* | 1/2021 | Schulz | G02B 21/04 |

FOREIGN PATENT DOCUMENTS

| JP | 2006065023 A | 3/2006 |
| JP | 2010186162 A | 8/2010 |

\* cited by examiner

*Primary Examiner* — Darryl J Collins
(74) *Attorney, Agent, or Firm* — Holtz, Holtz & Volek PC

(57) ABSTRACT

A dry microscope objective with a 20-fold magnification or lower that includes a first lens group having a positive refractive power and a second lens group having a positive refractive power, wherein the first and second lens groups have concave surfaces adjacent to each other and facing each other, and the microscope objective satisfies the following conditional expressions:

$$1.4 \leq (W_z(1) - W_z(0))/DOF_d \leq 2.3 \quad (1)$$

$$0 \leq W_{CRMS}(Fiy) \leq 0.1\lambda_d \ (0 \leq Fiy \leq 0.7) \quad (2)$$

where $W_z$ indicates a function of a d-line optimization position that is an longitudinal position at which an RMS wavefront aberration in a d line at the object height ratio is minimized; $DOF_d$ indicates a depth of focus for the d line; $W_{CRMS}$ indicates a function of an RMS wavefront aberration in a C line that occurs at the d-line optimization position; Fiy indicates the object height ratio; and $\lambda_d$ indicates the wavelength of the d line.

20 Claims, 6 Drawing Sheets

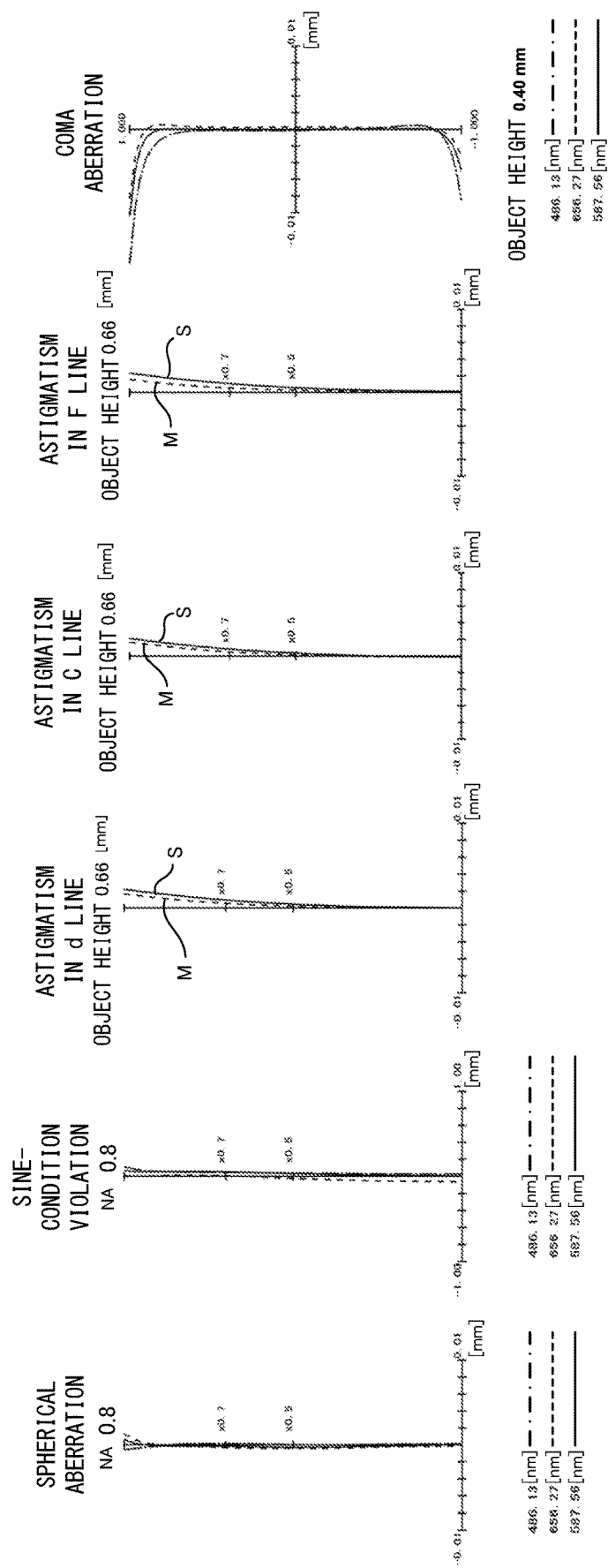

MICROSCOPE OBJECTIVE

CROSS REFERENCE TO RELATED APPLICATIONS

This application is based upon and claims the benefit of priority from prior Japanese Patent Application No. 2018-080949, filed Apr. 19, 2018, the entire contents of which are incorporated herein by this reference.

BACKGROUND OF THE INVENTION

Field of the Invention

The disclosure herein relates to a microscope objective and particularly to a dry microscope objective.

Description of the Related Art

In the field of biological microscopes in recent years, microscope apparatuses have been increasingly expected to allow observation and image capturing to be performed with both a wide field of view and a high resolution. Such microscope apparatuses are required to be provide with an objective that has a high numerical aperture (hereinafter referred to as NA) and that achieves a high aberration performance over a wide field of view. In addition, the objective will desirably be a dry objective in consideration of the usability in observations.

Japanese Laid-open Patent Publication No. 2006-65023 describes a microscope objective with a magnifying power of 4 to 10 that has a preferable imaging performance for a range from a visible region to a near-infrared region. Japanese Laid-open Patent Publication No. 2010-186162 describes a microscope objective that has a high aberration performance for a wide field of view in a camera observation.

SUMMARY OF THE INVENTION

A microscope objective in accordance with an aspect of the present invention is a dry microscope objective with a 20-fold magnification or lower that includes a first lens group having a positive refractive power and a second lens group having a positive refractive power, wherein an object, the first lens group, and the second lens group are arranged in this order. The first and second lens groups have concave surfaces adjacent to each other and facing each other. The microscope objective satisfies the following conditional expressions:

$$1.4 \leq (W_z(1)-W_z(0))/\text{DOF}_d \leq 2.3 \quad (1)$$

$$0 \leq W_{CRMS}(Fiy) \leq 0.1\lambda_d \ (0 \leq Fiy \leq 0.7) \quad (2)$$

In these conditional expressions, $W_z$ indicates a function that depends on an object height ratio, the function being a function of a d-line optimization position that is an longitudinal position at which an RMS wavefront aberration in a d line at the object height ratio is minimized; $\text{DOF}_d$ indicates a depth of focus for the d line; $W_{CRMS}$ indicates a function that depends on the object height ratio, the function being a function of an RMS wavefront aberration in a C line that occurs at the d-line optimization position; Fiy indicates the object height ratio; and $\lambda_d$ indicates the wavelength of the d line.

A microscope objective in accordance with another aspect of the present invention is a dry microscope objective with a 20-fold magnification or lower that includes a first lens group having a positive refractive power and a second lens group having a positive refractive power, wherein an object, the first lens group, and the second lens group are arranged in this order. The first and second lens groups have concave surfaces adjacent to each other and facing each other. The microscope objective satisfies the following conditional expressions:

$$0 \leq FCY(Fiy)/\text{DOF}_d \leq 5 \ (0.2 \leq Fiy \leq 1) \quad (4)$$

$$-3 \leq (FCY_C(Fiy)-FCY_F(Fiy))/\text{DOF}_d \leq 3 \quad (5)$$

In these conditional expressions, FCY indicates a function that depends on an object height ratio, the function being a function of a field curvature in the d line that occurs on a meridional plane; $FCY_C$ indicates a function that depends on the object height ratio, the function being a function of a field curvature in the C line that occurs on the meridional plane; $FCY_F$ indicates a function that depends on the object height ratio, the function being a function of a field curvature in an F line that occurs on the meridional plane; $\text{DOF}_d$ indicates a depth of focus for the d line; and Fiy indicates the object height ratio.

A microscope objective in accordance with still another aspect of the present invention is a dry microscope objective with a 20-fold magnification or lower that includes a first lens group having a positive refractive power and a second lens group having a positive refractive power, wherein an object, the first lens group, and the second lens group are arranged in this order. The first and second lens groups have concave surfaces adjacent to each other and facing each other. The microscope objective satisfies the following conditional expressions:

$$-1.1 \leq MTFm_{peak}(Fiy)/(\text{DOF}_d \times Fiy^2) \leq 5 \ (0.2 \leq Fiy \leq 1) \quad (8)$$

$$-1.2 \leq \text{ave}(MTFm_{peakC}(Fiy)-MTFm_{peakF}(Fiy))/\text{DOF}_d \leq 1.2 \ (0 \leq Fiy \leq 0.8) \quad (9)$$

In these conditional expressions, $MTFm_{peak}$ indicates a function that depends on the object height ratio, the function being a function of an longitudinal position on a meridional plane at which an MTF specific to the d line is maximized; $\text{DOF}_d$ indicates a depth of focus for the d line; Fiy indicates the object height ratio; $MTFm_{peakC}$ indicates a function that depends on the object height ratio, the function being a function of an longitudinal position on the meridional plane at which an MTF specific to the C line is maximized; and $MTFm_{peakF}$ indicates a function that depends on the object height ratio, the function being a function of an longitudinal position on the meridional plane at which an MTF specific to an F line is maximized. The MTF specific to the d line, the MTF specific to the C line, and the MTF specific to the F line are based on a reference spatial frequency that is a spatial frequency corresponding to an Airy disk radius. ave indicates an averaging function.

BRIEF DESCRIPTION OF THE DRAWINGS

The present invention will be more apparent from the following detailed description when the accompanying drawings are referenced.

FIGS. 6A-6F are each an aberration diagram for the objective 3 depicted in FIG. 5.

DESCRIPTION OF THE EMBODIMENTS

Figure 1:
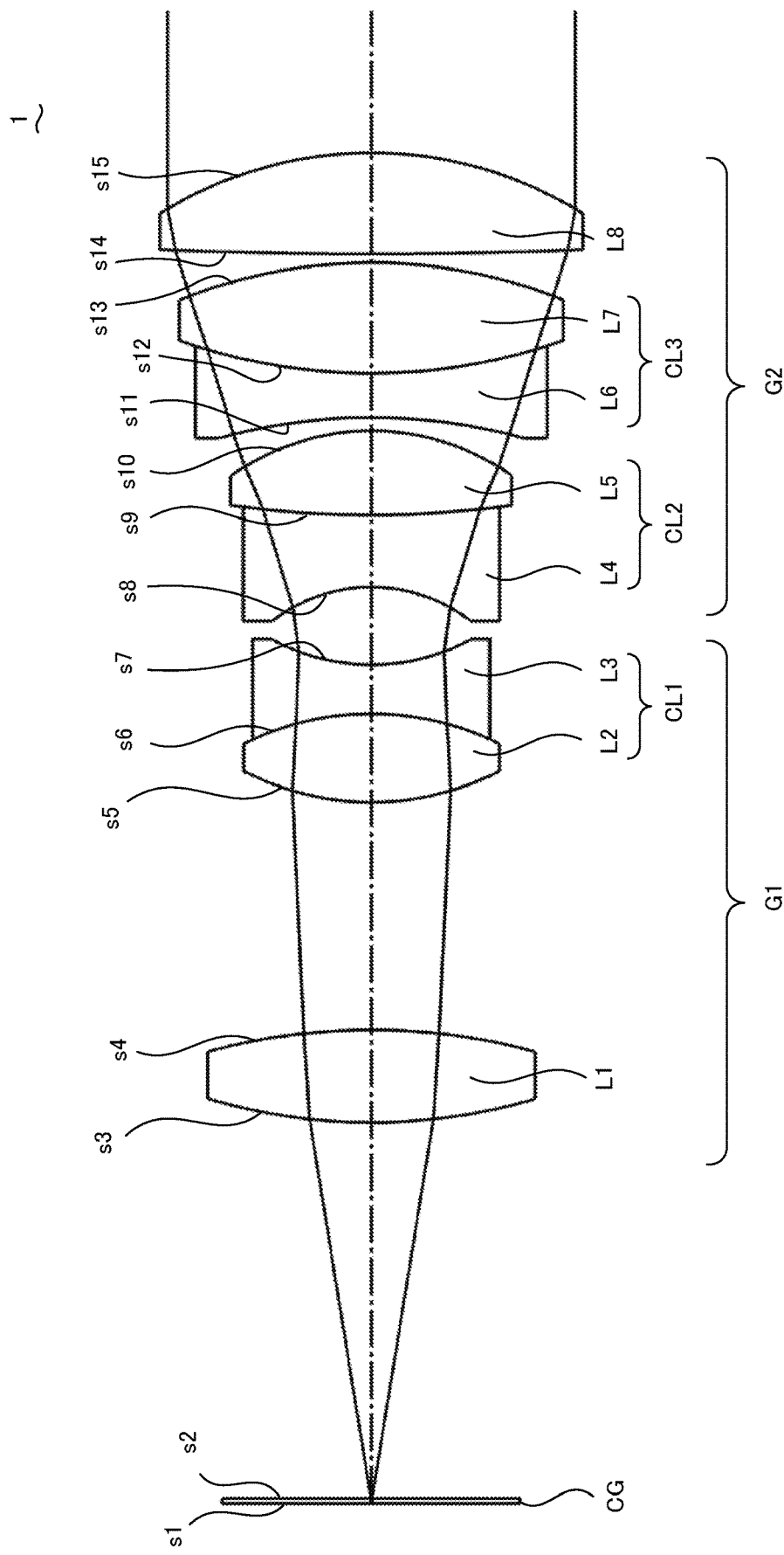
FIG. 1 is a cross-sectional view of an objective 1 in accordance with a first embodiment of the invention.

A high aberration performance over a wide field of view will desirably be achieved in both a visual observation and a camera observation. However, an eyepiece used in a visual observation typically has a field curvature having a shape such that off-axis portions are inclined toward an object. Hence, it is difficult to achieve high aberration performances for both a visual observation in which an eyepiece is used and a camera observation in which an eyepiece is not used.

The objectives described in Japanese Laid-open Patent Publication Nos. 2006-65023 and 2010-186162 achieve high flatness for one of a visual observation or a camera observation but do not sufficiently correct a field curvature for the other observation.

The following describes an objective in accordance with an embodiment of the present application. The objective is an infinity-corrected microscope objective to be used in combination with a tube lens. The objective is what is called a dry objective and is used to observe a sample S with air between the sample S and the objective. More particularly, the objective is a dry objective that achieves a 20-fold magnification or lower when the objective is combined with a tube lens having a focal length of 180 mm. Hence, a wide field of view and a high degree of usability can be provided for a user. Meanwhile, the objective can achieve a high off-axis performance over a wide field of view in both a visual observation in which an eyepiece is used and a camera observation in which an imaging apparatus is used. The following describes a configuration for the objective in detail.

The objective has a two-group configuration. The objective includes a first lens group and a second lens group, wherein an object, the first lens group, and the second lens group are arranged in this order. The first and second lens groups each have a positive refractive power and have concave surfaces adjacent to each other and facing each other. A border between the first and second lens groups may be identified in accordance with this feature.

The first lens group temporarily turns highly telecentric diverging light generated from an object surface into parallel light or converging light while changing the angle of an off-axis principal ray, then turns the parallel or converging light into diverging light, and causes the diverging light to be incident on the second lens group. The second lens group turns the diverging light incident from the first lens group into parallel light and emits the parallel light.

The objective configured as described above temporarily turns diverging light from an object point into parallel light or converging light within the first lens group. Then, the parallel or converging light is turned into diverging light and emitted from the second lens group as parallel light. In this way, the objective corrects various aberrations, including a Petzval sum, by increasing and decreasing the height of the light ray.

The objective satisfies conditional expressions (1) and (2).

$$1.4 \leq (W_z(1)-W_z(0))/DOF_d \leq 2.3 \quad (1)$$

$$0 \leq W_{CRMS}(Fiy) \leq 0.1\lambda_d \quad (0 \leq Fiy \leq 0.7) \quad (2)$$

In these conditional expressions, $W_z$ indicates a function that depends on an object height ratio, the function being a function of an longitudinal position at which an RMS wavefront aberration in a d line at the object height ratio is minimized (hereinafter referred to as a d-line optimization position); $DOF_d$ indicates a depth of focus for the d line; $W_{CRMS}$ indicates a function that depends on the object height ratio, the function being a function of an RMS wavefront aberration in a C line that occurs at the d-line optimization position; Fiy indicates the object height ratio; and $\lambda_d$ indicates the wavelength of the d line.

Function $W_z$ is a function of a position on the object side of the objective that can be calculated by performing counterlight tracking, wherein a direction from the image side to the object side is defined as a positive direction. As indicated in the reference document of "M. Born and E. Wolf, 'Principles of optics: electromagnetic theory or propagation, Interference and Diffraction of Light', Sixth Edition (Pergamon Press, 1993)", a wavefront aberration is represented by an optical-path-length difference Φ, which is an optical-path-length difference between a reference sphere and a wave front on an exit pupil plane. An RMS wavefront aberration is calculated by taking the root mean square of the optical-path-length difference Φ at the exit pupil plane. Focal depth $DOF_d$ is calculated by $\lambda_d/(2 \times NA^2)$, where $\lambda_d$ indicates the wavelength of a d line, and NA indicates the numerical aperture of the object side of the objective. Object height ratio Fiy indicates the ratio of a focused-on object height to a maximum object height. The maximum object height is calculated by $(FN/\beta)/2$, where FN indicates the field number of a microscope apparatus, and β indicates the magnification of the objective.

Conditional expression (1) indicates a difference between an axial longitudinal position at which a wavefront aberration is corrected in a preferable manner and an outermost off-axis longitudinal position at which a wavefront aberration is corrected in a preferable manner (difference between positions in an optical-axis direction), and defines a field curvature. Conditional expression (1) uses a value that is the difference in longitudinal position divided by a depth of focus so as to evaluate the degree of a field curvature regardless of the numerical aperture of the objective.

When $(W_z(1)-W_z(0))/DOF_d$ is a positive value, aberrations (field curvatures) that occur within an eyepiece can be corrected. In particular, when $(W_z(1)-W_z(0))/DOF_d$ is equal to or higher than a lower limit of conditional expression (1), aberrations (field curvatures) that occur within the eyepiece can be sufficiently corrected. Hence, a high off-axis performance can be achieved in a visual observation. When $(W_z(1)-W_z(0))/DOF_d$ is equal to or lower than an upper limit of conditional expression (1), aberrations (field curvatures) that occur within the objective do not become excessively large. Hence, a high off-axis performance can also be achieved in a camera observation in which an eyepiece is not used.

Conditional expression (2) indicates a wavefront aberration in a C line at a position at which a wavefront aberration in a d line has been corrected in a preferable manner. The objective satisfies conditional expression (2) with object height ratio Fiy falling within a range from 0 to 0.7.

$W_{CRMS}(Fiy)$ is a root-mean-square value and thus always 0 or higher. When $W_{CRMS}(Fiy)$ is equal to or lower than an upper limit of conditional expression (2), an image surface of the d line and an image surface of the C line do not have a large difference in position therebetween. Hence, a preferable white observation can be performed without flatness being degraded.

As described above, by the objective satisfying conditional expressions (1) and (2), high off-axis performances can be achieved for a wide field of view in both a visual observation and a camera observation.

When the objective is a low-magnification objective that is often used in, among other things, a visual observation, the objective may satisfy conditional expression (1-1) instead of conditional expression (1). This allows a higher off-axis performance to be achieved in a visual observation. A low magnification refers to, for example, a magnifying power of about 4 to 10.

$$2.0 \leq (W_z(1) - W_z(0))/DOF_d \leq 2.3 \quad (1\text{-}1)$$

When the objective is an intermediate-magnification objective that is used in both a visual observation and a camera observation, the objective may satisfy conditional expression (1-2) instead of conditional expression (1). This allows a higher off-axis performance to be achieved in a camera observation. An intermediate magnification refers to, for example, a magnifying power of about 10 to 20.

$$1.4 \leq (W_z(1) - W_z(0))/DOF_d \leq 1.7 \quad (1\text{-}2)$$

The objective may further satisfy conditional expression (3).

$$0 \leq W_{FRMS}(Fiy) \leq 0.2\lambda_d \quad (0 \leq Fiy \leq 0.7) \quad (3)$$

In this conditional expression, $W_{FRMS}$ indicates a function that depends on an object height ratio, the function being a function of an RMS wavefront aberration in an F line that occurs at the d-line optimization position.

Conditional expression (3) indicates a wavefront aberration in an F line at a position at which a wavefront aberration in a d line has been corrected in a preferable manner. The objective satisfies conditional expression (3) with object height ratio Fiy falling within a range from 0 to 0.7.

$W_{FRMS}(Fiy)$ is a root-mean-square value and thus always 0 or higher. When $W_{FRMS}(Fiy)$ is equal to or lower than an upper limit of conditional expression (3), an image surface of the d line and an image surface of the F line do not have a large difference in position therebetween. Hence, a preferable white observation can be performed without flatness being degraded.

The objective may satisfy conditional expressions (4) and (5) in addition to, or instead of, conditional expressions (1) and (2).

$$0 \leq FCY(Fiy)/DOF_d \leq 5 \quad (0.2 \leq Fiy \leq 1) \quad (4)$$

$$-3 \leq (FCY_C(Fiy) - FCY_F(Fiy))/DOF_d \leq 3 \quad (5)$$

In these conditional expressions, FCY indicates a function that depends on an object height ratio, the function being a function of a field curvature in a d line that occurs on a meridional plane; $FCY_C$ indicates a function that depends on the object height ratio, the function being a function of a field curvature in a C line that occurs on the meridional plane; and $FCY_F$ indicates a function that depends on the object height ratio, the function being a function of a field curvature in an F line that occurs on the meridional plane. Functions FCY, $FCY_C$, and $FCY_F$ are functions of a field curvature on the object side of the objective that can be calculated by performing counterlight tracking, wherein a direction from the image side to the object side is defined as a positive direction.

Conditional expression (4) indicates afield curvature in the d line that occurs on the meridional plane. Conditional expression (4) uses a value that is the field curvature divided by a depth of focus so as to evaluate the degree of the field curvature regardless of the numerical aperture of the objective. The objective satisfies conditional expression (4) with object height ratio Fiy falling within a range from 0.2 to 1.

When FCY (Fiy)/$DOF_d$ is equal to or higher than a lower limit of conditional expression (4), aberrations (field curvatures) that occur within an eyepiece can be corrected. Hence, a high off-axis performance can be achieved in a visual observation. When FCY(Fiy)/$DOF_d$ is equal to or lower than an upper limit of conditional expression (4), aberrations (field curvatures) that occur within the objective do not become excessively large. Hence, a high off-axis performance can also be achieved in a camera observation in which an eyepiece is not used.

Conditional expression (5) indicates a difference between a field curvature in the C line that occurs on the meridional plane and a field curvature in the F line that occurs on the meridional plane. Conditional expression (5) uses a value that is the difference in field curvature divided by a depth of focus so as to evaluate the degree of the field curvature regardless of the numerical aperture of the objective. The objective satisfies conditional expression (5) with object height ratio Fiy falling within a range from 0 to 1.

When $(FCY_C(Fiy) - FCY_F(Fiy))/DOF_d$ falls within a range from a lower limit of conditional expression (5) to an upper limit of conditional expression (5), the field curvature in the C line and the field curvature in the F line do not have a large difference therebetween so that chromatic aberrations can be corrected in a preferable manner. Hence, a preferable white observation can be performed without flatness being degraded.

The objective may satisfy conditional expression (4-1) instead of conditional expression (4). This allows a higher off-axis performance to be achieved in a camera observation.

$$0 \leq FCY(Fiy)/DOF_d \leq 4 \quad (0.2 \leq Fiy \leq 1) \quad (4\text{-}1)$$

The objective may satisfy conditional expression (5-1) instead of conditional expression (5). This allows a higher off-axis performance to be achieved in a white observation.

$$-2.0 \leq (FCY_C(Fiy) - FCY_F(Fiy))/DOF_d \leq 2.7 \quad (5\text{-}1)$$

The objective may further satisfy at least one of conditional expression (6) or (7).

$$0 \leq FCX(Fiy)/DOF_d \leq 5 \quad (0.2 \leq Fiy \leq 1) \quad (6)$$

$$1 \leq (FCY(Fiy) + FCX(Fiy))/(2 \times DOF_d \times Fiy^2) \leq 5 \quad (0.2 \leq Fiy \leq 1) \quad (7)$$

In these conditional expressions, FCX indicates a function that depends on the object height ratio, the function being a function of a field curvature in the d line that occurs on a sagittal plane. Function FCX is a function of a field curvature on the object side of the objective that can be calculated by performing counterlight tracking, wherein a direction from the image side to the object side is defined as a positive direction.

Conditional expression (6) indicates afield curvature in the d line that occurs on the sagittal plane. Conditional expression (6) uses a value that is the field curvature divided by a depth of focus so as to evaluate the degree of the field curvature regardless of the numerical aperture of the objective. The objective satisfies conditional expression (6) with object height ratio Fiy falling within a range from 0.2 to 1.

When FCX (Fiy)/$DOF_d$ is equal to or higher than a lower limit of conditional expression (6), aberrations (field curvatures) that occur within an eyepiece can be corrected. Hence, a high off-axis performance can be achieved in a visual observation. When FCX (Fiy)/$DOF_d$ is equal to or lower than an upper limit of conditional expression (6), aberrations (field curvatures) that occur within the objective do not become excessively large. Hence, a high off-axis performance can also be achieved in a camera observation in which an eyepiece is not used.

Conditional expression (7) indicates the average of field curvatures in the d line. Conditional expression (7) uses a value that is the average of field curvatures divided by the product of a depth of focus and the square of an object height ratio so as to evaluate the degree of the field curvatures regardless of the numerical aperture of the objective and an object height. The objective satisfies conditional expression (7) with object height ratio Fiy falling within a range from 0.2 to 1.

When $(FCY(Fiy)+FCX(Fiy))/(2 \times DOF_d \times Fiy^2)$ is equal to or higher than a lower limit of conditional expression (7), aberrations (field curvatures) that occur within an eyepiece can be corrected. Hence, a high off-axis performance can be achieved in a visual observation. When $(FCY(Fiy)+FCX(Fiy))/(2 \times DOF_d \times Fiy^2)$ is equal to or lower than an upper limit of conditional expression (7), aberrations (field curvatures) that occur within the objective do not become excessively large. Hence, a high off-axis performance can also be achieved in a camera observation in which an eyepiece is not used.

The objective may satisfy conditional expression (6-1) instead of conditional expression (6). This allows a higher off-axis performance to be achieved in a camera observation.

$$0 \leq FCX(Fiy)/DOF_d \leq 3 \quad (0.2 \leq Fiy \leq 1) \tag{6-1}$$

The objective may satisfy conditional expression (7-1) instead of conditional expression (7). This allows higher off-axis performances to be achieved in both a visual observation and a camera observation.

$$1.5 \leq (FCY(Fiy)+FCX(Fiy))/(2 \times DOF_d \times Fiy^2) \leq 4.5 \\ (0.2 \leq Fiy \leq 1) \tag{7-1}$$

The objective may satisfy conditional expressions (8) and (9) in addition to, or instead of, conditional expressions (1) and (2).

$$-1.1 \leq MTFm_{peak}(Fiy)/(DOF_d \times Fiy^2) \leq 5 \quad (0.2 \leq Fiy \leq 1) \tag{8}$$

$$-1.2 \leq ave(MTFm_{peakC}(Fiy)-MTFm_{peakF}(Fiy))/DOF_d \leq 1.2 \quad (0 \leq Fiy \leq 0.8) \tag{9}$$

In these conditional expressions, $MTFm_{peak}$ indicates a function that depends on an object height ratio, the function being a function of an longitudinal position on a meridional plane at which an MTF specific to a d line is maximized; $MTFm_{peakC}$ indicates a function that depends on the object height ratio, the function being a function of an longitudinal position on the meridional plane at which an MTF specific to a C line is maximized; $MTFm_{peakF}$ indicates a function that depends on the object height ratio, the function being a function of an longitudinal position on the meridional plane at which an MTF specific to an F line is maximized; and ave indicates an averaging function.

$MTFm_{peak}$, $MTFm_{peakC}$, and $MTFm_{peakF}$ each indicate a function of a position on the object side of the objective that can be calculated by performing counterlight tracking, wherein an longitudinal position with an object height ratio of 0 is defined as an origin, and a direction from the image side to the object side is defined as a positive direction. The MTF specific to the d line, the MTF specific to the C line, and the MTF specific to the F line are MTFs achieved at a spatial frequency corresponding to an Airy disk radius (hereinafter referred to as a reference spatial frequency Freq). The reference spatial frequency Freq is calculated by 0.5/Airy, where Airy indicates an Airy disk diameter. The Airy disk diameter Airy is calculated by $0.61\lambda_d/NA$, where $\lambda_d$ indicates the wavelength of the d line, and NA indicates the numerical aperture of the object side of the objective.

Conditional expression (8) indicates afield curvature in the d line that occurs on the meridional plane. Conditional expression (8) is different from conditional expression (4) in that conditional expression (8) indicates a field curvature by using an MTF instead of a light-focused position.

Conditional expression (8) uses a value that is a field curvature divided by the product of a depth of focus and the square of an object height ratio so as to evaluate the degree of the field curvature regardless of the numerical aperture of the objective and an object height. The objective satisfies conditional expression (8) with object height ratio Fiy falling within a range from 0.2 to 1.

When $MTFm_{peak}(Fiy)/(DOF_d \times Fiy^2)$ is lower than a lower limit of conditional expression (8), field curvatures that occur within the eyepiece become dominant. This makes it difficult to achieve a high off-axis performance in a visual observation. When $MTFm_{peak}(Fiy)/(DOF_d \times Fiy^2)$ is higher than an upper limit of conditional expression (8), aberrations (field curvatures) that occur within the objective become excessively large. This makes it difficult to achieve a high off-axis performance in a camera observation in which an eyepiece is not used.

Conditional expression (9) indicates the average of a field curvature in the C line and a field curvature in the F line, wherein the field curvatures are expressed using MTFs instead of light-focused positions. Conditional expression (9) uses a value that is the field curvature divided by a depth of focus so as to evaluate the degree of the field curvature regardless of the numerical aperture of the objective. The objective satisfies conditional expression (9) with object height ratio Fiy falling within a range from 0 to 0.8.

When ave $(MTFm_{peakC}(Fiy)-MTFm_{peakF}(Fiy))/DOF_d$ falls within a range from a lower limit of conditional expression (9) to an upper limit of conditional expression (9), image surfaces each associated with a particular color do not have large differences in position therebetween, so that chromatic aberrations can be corrected in a preferable manner. Hence, a preferable white observation can be performed without flatness being degraded.

The objective may satisfy conditional expression (8-1) instead of conditional expression (8). This allows higher off-axis performances to be achieved in both a visual observation and a camera observation.

$$-1.1 \leq MTFm_{peak}(Fiy)/(DOF_d \times Fiy^2) \leq 2.7 \quad (0.2 \leq Fiy \leq 1) \tag{8-1}$$

The objective may satisfy conditional expression (9-1) instead of conditional expression (9). This allows a higher off-axis performance to be achieved in a white observation.

$$-1.2 \leq ave(MTFm_{peakC}(Fiy)-MTFm_{peakF}(Fiy))/DOF_d \leq 0.8 \quad (0 \leq Fiy \leq 0.8) \tag{9-1}$$

The objective may further satisfy conditional expression (10).

$$-1.1 \leq MTFs_{peak}(Fiy)/(DOF_d \times Fiy^2) \leq 5 \quad (0.2 \leq Fiy \leq 1) \tag{10}$$

In this conditional expression, $MTFs_{peak}$ indicates a function that depends on the object height ratio, the function being a function of an longitudinal position on a sagittal plane at which an MTF specific to the d line is maximized. Note that $MTFs_{peak}$ is a function of a position on the object side of the objective that can be calculated by performing counterlight tracking, wherein an longitudinal position with an object height ratio of 0 is defined as an origin, and a direction from the image side to the object side is defined as a positive direction. The MTF specific to the d line is based on the reference spatial frequency Freq.

Conditional expression (10) indicates a field curvature in the d line that occurs on the sagittal plane. Conditional expression (10) is different from conditional expression (6) in that conditional expression (10) indicates a field curvature by using an MTF instead of a light-focused position. Conditional expression (10) uses a value that is a field curvature divided by the product of a depth of focus and the square of an object height ratio so as to evaluate the degree of the field curvature regardless of the numerical aperture of the objective and an object height. The objective satisfies conditional expression (10) with object height ratio Fiy falling within a range from 0.2 to 1.

When $MTFs_{peak}(Fiy)/(DOF_d \times Fiy^2)$ is lower than a lower limit of conditional expression (10), field curvatures that occur within the eyepiece become dominant. This makes it difficult to achieve a high off-axis performance in a visual observation. When $MTFs_{peak}(Fiy)/(DOF_d \times Fiy^2)$ is higher than an upper limit of conditional expression (10), aberrations (field curvatures) that occur within the objective become excessively large. This makes it difficult to achieve a high off-axis performance in a camera observation in which an eyepiece is not used.

The objective may satisfy conditional expression (10-1) instead of conditional expression (10). This allows higher off-axis performances to be achieved in both a visual observation and a camera observation.

$$-1.1 \leq MTFs_{peak}(Fiy)/(DOF_d \times Fiy^2) \leq 3.1 \quad (0.2 \leq Fiy \leq 1) \quad (10\text{-}1)$$

The second lens group of the objective desirably includes a single lens that is the closest to the image among the lenses of the second lens group (hereinafter referred to as a final lens), and in this case, the objective desirably satisfies conditional expression (11), where R indicates the radius of curvature of the lens surface of the image side of the final lens.

$$-15 \text{ mm} \leq R \leq -10 \text{ mm} \quad (11)$$

The single lens with a high radius of curvature that satisfies conditional expression (11) may form a field curvature in an opposite direction from a direction in which a field curvature is formed by another lens within the objective, with the result that the objective has a field curvature having a concave shape facing the object when counterlight tracking is performed. When R is lower than a lower limit of conditional expression (11), field curvatures that occur within the eyepiece become dominant. This makes it difficult to achieve a high off-axis performance in a visual observation. When R is higher than an upper limit of conditional expression (11), aberrations (field curvatures) that occur within the objective become excessively large. This makes it difficult to achieve a high off-axis performance in a camera observation in which an eyepiece is not used.

The objective may satisfy conditional expression (11-1) instead of conditional expression (11). This allows higher off-axis performances to be achieved in both a visual observation and a camera observation.

$$-14.1 \text{ mm} \leq R \leq -10.5 \text{ mm} \quad (11\text{-}1)$$

The objective may include three or more cemented lenses. This allows axial chromatic aberrations and chromatic aberrations of magnification in C and F lines to be corrected in a preferable manner. In the meantime, the objective may include two or more cemented lenses, and at least one of these cemented lenses may be a cemented triplet lens. This also allows axial chromatic aberrations and chromatic aberrations of magnification in C and F lines to be corrected in a preferable manner.

The following describes an example of a more desirable configuration for the objective.

The second lens group desirably includes at least one lens component having a negative refractive power overall, a cemented lens, and a single lens having a positive refractive power, wherein an object, the lens component, the cemented lens, and the single lens are arranged in this order. It is also desirable that the cemented lens be, for example, a cemented doublet lens consisting of a positive lens and a negative lens. In this case, the second lens group may turn diverging light incident from the first lens group into parallel light and emit the parallel light while correcting axial chromatic aberrations and off-axis coma aberrations and astigmatisms. The at least one lens component that has a negative refractive power overall serves mainly to increase the light ray height so as to achieve a higher numerical aperture. The cemented lens serves mainly to correct axial chromatic aberrations. The single lens serves mainly to turn diverging light into parallel light. Whether a single lens or a cemented lens, a lens component refers to one lens block that includes lens surfaces through which a light ray from an object point passes, wherein only a surface on an object side and a surface on an image side among these lens surfaces, i.e., only two of these lens surfaces, are in contact with air (or immersion liquid).

In addition, the axial marginal light ray height is desirably maximized at the lens surface that is the closest to the image among the lens surfaces of the objective. Such a configuration allows the refractive angle of a light ray within the objective to be limited so that axial chromatic aberrations can be suppressed while preventing the off-axis performance from being remarkably degraded in comparison with the axial performance.

The objective having the configuration described above desirably satisfies conditional expression (12).

$$-0.38 \leq F_S/F_C \leq 0.38 \quad (12)$$

In this conditional expression, $F_C$ indicates a focal length that the cemented lens included in the second lens group has for the d line; $F_S$, a focal length that the single lens included in the second lens group has for the d line. Note that the single lens is disposed on the image side of the cemented lens.

When $F_S/F_C$ is not lower than a lower limit, axial chromatic aberrations can be corrected in a preferable manner, and off-axis coma aberrations and astigmatisms can also be corrected in a preferable manner. More particularly, by the cemented lens having a low negative refractive power, axial chromatic aberrations that could be generated by another lens can be corrected. By the single lens having a high refractive power, the angle of an off-axis light ray can be gradually changed within the objective so as to correct off-axis coma aberrations and astigmatisms in a preferable manner. When $F_S/F_C$ is not higher than an upper limit, an axial chromatic aberration that has been excessively corrected by another lens can be corrected in the reverse direction using the low positive refractive power of the cemented lens.

By the objective satisfying conditional expression (12), axial chromatic aberrations and off-axis aberrations can be corrected in a preferable manner.

The following describes another example of a more desirable configuration for the objective.

The first lens group desirably includes a cemented lens having a concave surface facing an object (hereinafter referred to as a first cemented lens), a single lens having a positive refractive power (hereinafter referred to as a first single lens), and a cemented lens having a concave surface facing an image (hereinafter referred to as a second cemented lens), wherein the object, the first cemented lens, the first single lens, and the second cemented lens are arranged in this order. The second lens group desirably includes a cemented lens having a concave surface facing the object (hereinafter referred to as a third cemented lens) and a single lens having a positive refractive power (hereinafter referred to as a second single lens), wherein the object, the third cemented lens, and the second single lens are arranged in this order. In this case, each of the first, second, and third cemented lenses is desirably a cemented doublet lens consisting of one positive lens and one negative lens.

The objective configured as described above temporarily turns diverging light from an object point into converging light within the first lens group. Then, the converging light is turned into diverging light and emitted from the second lens group as parallel light. In this way, the objective can correct various aberrations, including a Petzval sum, by increasing and decreasing the height of the light ray.

The first and second cemented lenses are disposed within regions in the first lens group in which light ray heights are significantly changed and a high axial marginal light ray is provided. If a single lens is provided within such a region instead of a cemented lens, a light ray will be remarkably bent at the lens surfaces, thereby considerably generating various aberrations, including axial chromatic aberrations. This will make it difficult to correct aberrations throughout the objective in a preferable manner. By contrast, the objective in accordance with an embodiment of the present application includes the first and second cemented lenses such that a light ray can be gradually changed. Hence, various aberrations such as axial chromatic aberrations and spherical aberrations can be corrected throughout the objective in a preferable manner. In particular, the first cemented lens, which also gradually bends an off-axis light ray, has a strong effect of correcting coma aberrations and chromatic aberrations of magnification.

The third cemented lens is disposed within a region in the second lens group in which light ray heights are gradually changed and a high axial marginal light ray is provided. By the third cemented lens being disposed within a region in which light ray heights are gradually changed, axial chromatic aberrations can be primarily corrected while curbing the influence on spherical aberrations and coma aberrations. In addition, field curvatures and distortion aberrations caused by the first lens group can be corrected. If a single lens is used instead of the third cemented lens, the light ray will be remarkably bent at the lens surfaces, thereby considerably generating various aberrations such as axial chromatic aberrations, spherical aberrations, coma aberrations, and field curvatures. This will make it difficult to correct aberrations throughout the objective in a preferable manner.

The objective having a configuration such as that described above desirably satisfies conditional expressions (13)-(15).

$$0.31 \leq NA < 1 \tag{13}$$

$$2.2 \leq H/f \leq 3.3 \tag{14}$$

$$0 < a/b \leq 1.2 \tag{15}$$

In these conditional expressions, NA indicates the numerical aperture of the object side of the objective; f indicates a focal length that the objective has for a d line; H indicates a distance from an object surface to the lens surface that is the closest to an image among the lens surfaces of the second lens group (i.e., final surface of the objective); a indicates the total of air space distances in the first lens group, wherein the air space distances in the first lens group each refer to the distance between adjacent lens surfaces included in the first lens group that have a space filled with air therebetween; and b indicates the thickness of the negative lens included in the second cemented lens. Note that both a and H are distances on an optical axis of the objective and that b is the thickness on the optical axis of the objective.

Conditional expression (13) defines effective ranges for resolution power and brightness. The objective in accordance with an embodiment of the present application is a dry objective and thus satisfies NA<1. When NA is lower than 0.31, the resolution power is likely to be decreased, and the image brightness is likely to be insufficient. Especially in a fluorescent observation, a subject is observed with a limited amount of illumination light so as to reduce cell cytotoxicity, and hence the brightness is likely to be especially insufficient.

Conditional expression (14) defines effective ranges for the magnification and parfocal distance of the objective. In consideration of the fact that the parfocal distance is limited to some degree, decreasing H/f to 2.2 or lower will provide a low magnification, resulting in an excessively wide field of view. This makes it difficult to dispose the first cemented lens that has a concave surface facing the object. If H/f is higher than 3.3, a high magnification will be achieved, and hence a larger positive power will be necessary. The objective that satisfies conditional expression (14) approximately has 10-fold magnification and a parfocal distance of 45-65 mm.

When the negative lens of the second cemented lens is excessively thick relative to the air space distance in the first cemented lens, a high axial marginal light ray will pass through a cemented surface of the second cemented lens. In particular, when a/b is 1.2 or lower, a sufficiently high axial marginal light ray will pass through the cemented surface. Accordingly, satisfying conditional expression (15) allows axial chromatic aberrations to be corrected in a preferable manner. In the meantime, since both a and b are positive values, a/b does not become 0 or lower. The second cemented lens serves to correct axial chromatic aberrations while correcting coma aberrations and field curvatures by gradually decreasing the height of a light ray. When a/b is higher than 1.2, the height of a light ray cannot be gradually decreased by gradually bending the light ray by using the second cemented lens. Hence, coma aberrations and chromatic aberrations become difficult to totally correct.

By the objective satisfying conditional expressions (13)-(15), various aberrations ranging from a short-wavelength region to a near-infrared region can be corrected in a preferable manner even though the objective has a low magnification.

The following describes still another example of a more desirable configuration for the objective.

The objective desirably satisfies conditional expression (16).

$$0.43 \leq (hg_2 - hg_1)/gt_1 \leq 1.5 \tag{16}$$

In this conditional expression, $gt_1$ indicates a thickness that a lens component that is the closest to the object among the components of the second lens group (hereinafter referred to as a first lens component of the second lens group) has on an optical axis, $hg_1$ indicates an axial marginal light ray height at a lens surface of the first lens component of the second lens group that is the closest to the object among the lens surfaces of the first lens component, and $hg_2$ indicates an axial marginal light ray height at a lens surface of the first lens component of the second lens group that is the closest to the image among the lens surfaces of the first lens component.

Conditional expression (16) defines a relationship between the difference in light ray height between light incident on the first lens component of the second lens group and light emitted from the first lens component of the second lens group and the thickness of the first lens component of the second lens group. By the first lens component of the second lens group significantly changing the light ray height, coma aberrations and field curvatures can be corrected in a preferable manner. Hence, the objective with a long focal length that has a 30-fold magnification or lower allows a high-contrast image to be obtained for a region up to the edge of a field of view.

When $(hg_2-hg_1)/gt_1$ is higher than an upper limit of conditional expression (16), a light ray is remarkably refracted at the lens surfaces of the incidence side and emission side of the first lens component of the second lens group. This provides a high-order spherical aberration and coma aberration, thereby making it difficult to obtain a preferable image. When $(hg_2-hg_1)/gt_1$ is lower than a lower limit of conditional expression (16), it is difficult for the objective with a long focal length to sufficiently correct coma aberrations and field curvatures. This makes it difficult to provide a high-contrast image for a region up to the edge of a field of view.

By satisfying conditional expression (16), the objective can have a high NA and correct chromatic aberrations and the off-axis performance in a preferable manner.

The objective may use only one of the above-described conditional expressions or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the objective.

First Embodiment

FIG. 1 is a cross-sectional view of an objective in accordance with the present embodiment. The objective 1 is a dry microscope objective and includes a first lens group G1 having a positive refractive power and a second lens group G2 having a positive refractive power, wherein an object, the first lens group G1, and the second lens group G2 are arranged in this order. The first lens group G1 and the second lens group G2 have concave surfaces adjacent to each other and facing each other.

The first lens group G1 includes a lens L1 that is a biconvex lens and a cemented lens CL1 having a concave surface facing an image, wherein the object, the lens L1, and the cemented lens CL1 are arranged in this order. The cemented lens CL1 is a cemented doublet lens and consists of a biconvex lens and a biconcave lens.

The second lens group G2 includes a cemented lens CL2 having a concave surface facing the object, a cemented lens CL3 having a concave surface facing the object, and a lens L8 that is a biconvex lens, wherein the object, the cemented lens CL2, the cemented lens CL3, and the lens L8 are arranged in this order. The cemented lens CL2 is a cemented doublet lens having a negative refractive power and consists of a biconcave lens and a biconvex lens, wherein the object, the biconcave lens, and the biconvex lens are arranged in this order. The cemented lens CL3 is a cemented doublet lens and consists of a biconcave lens and a biconvex lens, wherein the object, the biconcave lens, and the biconcave lens are arranged in this order. The lens L8 is a single lens having a positive refractive power.

The following are various data on the objective 1, where $F_{G1}$ indicates a focal length that the first lens group G1 has for a d line; $F_{G2}$, a focal length that the second lens group G2 has for the d line.

NA=0.16, FN=26.5 mm, f=45 mm, WD=13.25 mm, |β|=4, $DOF_d$=11.46 μm, $F_{G1}$=21.73 mm, $F_{G2}$=56.51 mm, $F_S$=26.43 mm, $F_C$=−5378.51 mm

The following are lens data of the objective 1. INF in the lens data indicates infinity (∞).

| | | Objective 1 | | |
|---|---|---|---|---|
| s | r | d | nd | vd |
| 1 | ∞ | 0.17 | 1.52397 | 54.41 |
| 2 | ∞ | 13.2458 | | |
| 3 | 20.4097 | 3.2684 | 1.51633 | 64.14 |
| 4 | −22.1977 | 8.0214 | | |
| 5 | 9.8755 | 3.0895 | 1.43875 | 94.66 |
| 6 | −10.1728 | 1.7328 | 1.51633 | 64.14 |
| 7 | 7.3477 | 2.7456 | | |
| 8 | −5.7177 | 2.5231 | 1.755 | 52.32 |
| 9 | 36.266 | 2.9771 | 1.43875 | 94.66 |
| 10 | −8.5226 | 0.4709 | | |
| 11 | −20.1257 | 1.5608 | 1.48749 | 70.23 |
| 12 | 20.4365 | 3.8973 | 1.43875 | 94.66 |
| 13 | −18.1858 | 0.3014 | | |
| 14 | 185.9612 | 3.5703 | 1.497 | 81.54 |
| 15 | −14.0427 | | | | s indicates a surface number; r, a radius of curvature (mm); d, a surface interval (mm); nd, a refractive index for a d line; vd, an Abbe number. These marks are also applicable to the embodiments described hereinafter. Surface numbers s1 and s2 respectively indicate an object surface (surface of cover glass CG on an object side) and a surface of the cover glass CG on an image side. Surface numbers s3 and s15 respectively indicate a lens surface that is the closest to an object among the lens surfaces of the objective 1 and a lens surface that is the closest to an image among the lens surfaces of the objective 1. Surface interval d1 indicates a distance on an optical axis from the surface indicated as surface number s1 to the surface indicated as surface number s2.

The following indicates, for the objective 1, an object height ratio Fiy, a d-line optimization position $W_z$, an RMS wavefront aberration $W_{FRMS}$ in a C line at the d-line optimization position, and an RMS wavefront aberration $W_{FRMS}$ in an F line at the d-line optimization position.

| Fiy | Wz (Fiy) | WCRMS (Fiy) | WFRMS (Fiy) |
|---|---|---|---|
| 0 | 0.00 | 0.007 | 0.029 |
| 0.05 | 0.00 | 0.010 | 0.030 |
| 0.1 | 0.02 | 0.016 | 0.034 |
| 0.15 | 0.03 | 0.023 | 0.039 |
| 0.2 | 0.06 | 0.029 | 0.045 |
| 0.25 | 0.10 | 0.035 | 0.052 |

-continued

| Fiy | Wz (Fiy) | WCRMS (Fiy) | WFRMS (Fiy) |
|---|---|---|---|
| 0.3 | 0.15 | 0.040 | 0.058 |
| 0.35 | 0.20 | 0.045 | 0.063 |
| 0.4 | 0.27 | 0.049 | 0.068 |
| 0.45 | 0.35 | 0.052 | 0.072 |
| 0.5 | 0.45 | 0.054 | 0.076 |
| 0.55 | 0.56 | 0.055 | 0.079 |
| 0.6 | 0.68 | 0.055 | 0.081 |
| 0.65 | 0.82 | 0.054 | 0.083 |
| 0.7 | 0.98 | 0.052 | 0.085 |
| 0.75 | 1.16 | | |
| 0.8 | 1.34 | | |
| 0.85 | 1.54 | | |
| 0.9 | 1.74 | | |
| 0.95 | 1.96 | | |
| 1 | 2.17 | | |

As indicated in the following, the objective 1 satisfies conditional expressions (1)-(13).

$$(W_z(1)-W_z(0))/DOF_d=2.17 \quad (1)$$

$$Max(W_{CRMS}(Fiy))=0.055 \quad (2)$$

$$Max(W_{FRMS}(Fiy))=0.085 \quad (3)$$

$$Min(FCY(Fiy)/DOF_d)=0.05$$

$$Max(FCY(Fiy)/DOF_d)=1.56 \quad (4)$$

$$Min((FCY_C(Fiy)-FCY_F(Fiy))/DOF_d)=1.04$$

$$Max((FCY_C(Fiy)-FCY_F(Fiy))/DOF_d)=2.69 \quad (5)$$

$$Min(FCX(Fiy)/DOF_d)=0.08$$

$$Max(FCX(Fiy)/DOF_d)=2.45 \quad (6)$$

$$Min((FCY(Fiy)+FCX(Fiy))/(2\times DOF_d\times Fiy^2))=1.62$$

$$Max((FCY(Fiy)+FCX(Fiy))/(2\times DOF_d\times Fiy^2))=2.02 \quad (7)$$

$$Min(MTFm_{peak}(Fiy)/(DOF_d\times Fiy^2))=1.49$$

$$Max(MTFm_{peak}(Fiy)/(DOF_d\times Fiy^2))=2.07 \quad (8)$$

$$ave(MTFm_{peakC}(Fiy)-MTFm_{peakF}(Fiy))/DOF_d=0.74 \quad (9)$$

$$Min(MTFs_{peak}(Fiy)/(DOF_d\times Fiy^2))=1.91$$

$$Max(MTFs_{peak}(Fiy)/(DOF_d\times Fiy^2))=2.36 \quad (10)$$

$$R=-14.0427 \text{ mm} \quad (11)$$

$$F_S/F_C=-0.005 \quad (12)$$

$$NA=0.16 \quad (13)$$

Figure 2:
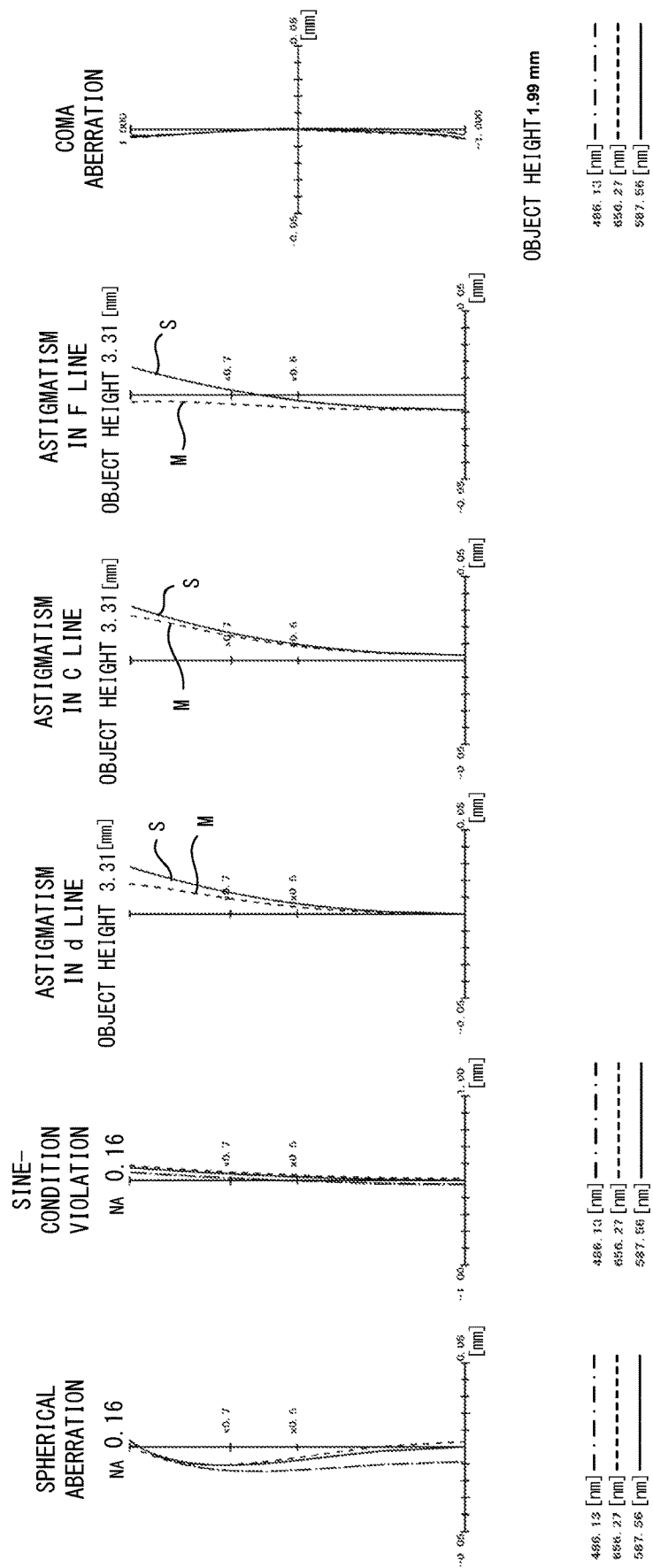
FIGS. 2A-2F are each an aberration diagram for the objective 1 depicted in FIG. 1.

FIGS. 2A-2F are each an aberration diagram for the objective 1 depicted in FIG. 1 and indicate aberrations that occur on an image surface when a pencil of infinitely distant light is incident from an image side. FIG. 2A is a spherical aberration diagram. FIG. 2B illustrates a sine-condition violation amount. FIG. 2C is an astigmatism diagram for a d line. FIG. 2D is an astigmatism diagram for a C line. FIG. 2E is an astigmatism diagram for an F line. FIG. 2F is a coma aberration diagram for a position with an object height ratio of 0.6 (object height 1.99 mm). "M" in the figures indicates a meridional component, and "S" indicates a sagittal component. Similar aberration diagrams will also be presented for embodiments described hereinafter.

Second Embodiment

Figure 3:
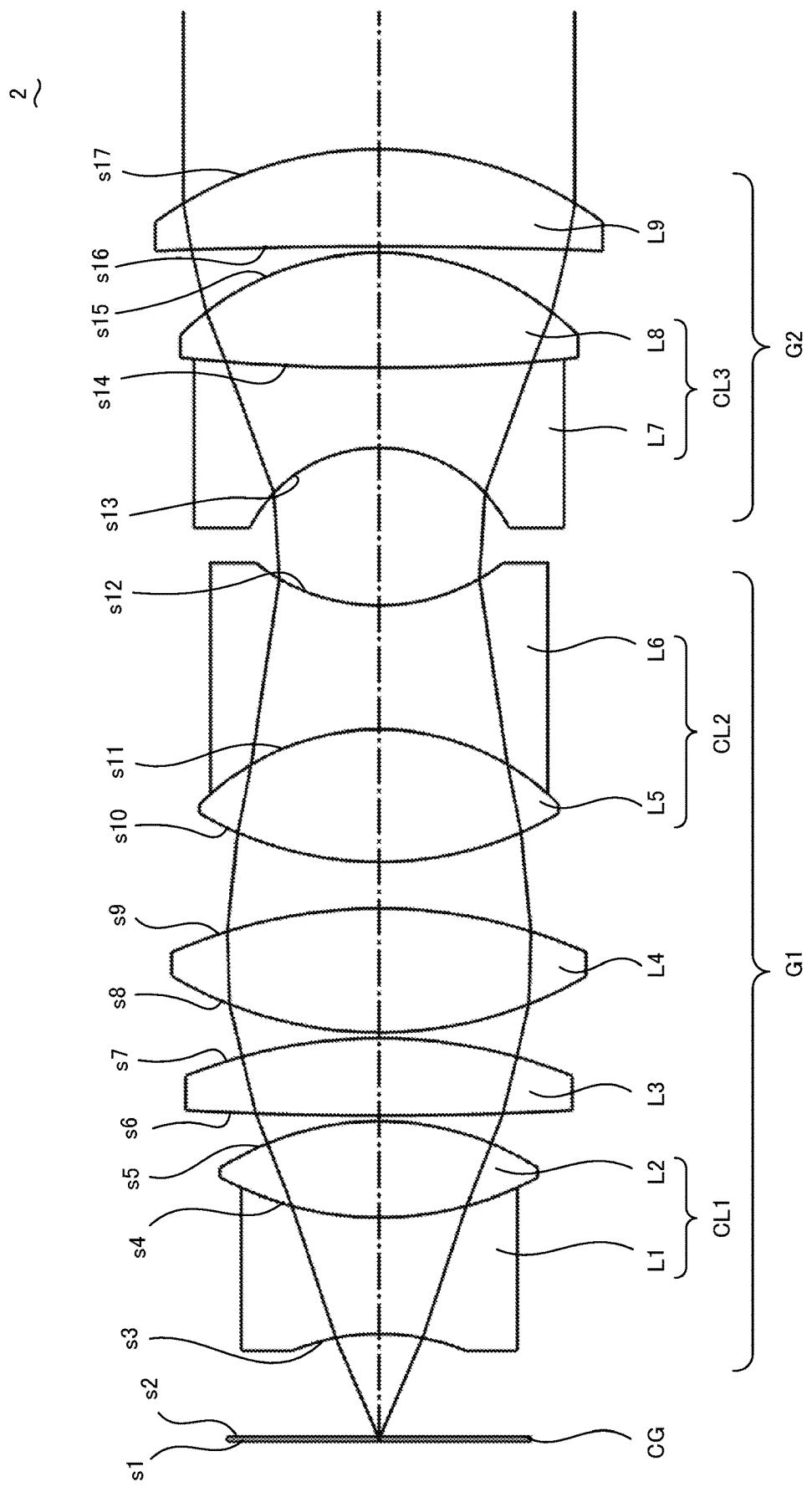
FIG. 3 is a cross-sectional view of an objective 2 in accordance with a second embodiment of the invention.

FIG. 3 is a cross-sectional view of an objective in accordance with the present embodiment. The objective 2 is a dry microscope objective and includes a first lens group G1 having a positive refractive power and a second lens group G2 having a positive refractive power, wherein an object, the first lens group G1, and the second lens group G2 are arranged in this order. The first lens group G1 and the second lens group G2 have concave surfaces adjacent to each other and facing each other.

The first lens group G1 includes a cemented lens CL1 having a concave surface facing an object, a lens L3 that is a biconvex lens, a lens L4 that is a biconvex lens, and a cemented lens CL2 having a concave surface facing an image, wherein an object, the cemented lens CL1, the lens L3, the lens L4, and the cemented lens CL2 are arranged in this order. The cemented lens CL1 is a cemented doublet lens and consists of a biconcave lens and a biconvex lens, wherein the object, the biconcave lens, and the biconvex lens are arranged in this order. The cemented lens CL2 is a cemented doublet lens and consists of a biconvex lens and a biconcave lens, wherein the object, the biconvex lens, and the biconcave lens are arranged in this order.

The second lens group G2 includes a cemented lens CL3 having a concave surface facing the object and a lens L9 that is a meniscus lens having a concave surface facing the object, wherein the object, the cemented lens CL3, and the lens L9 are arranged in this order. The cemented lens CL3 is a cemented doublet lens and consists of a biconcave lens and a biconvex lens, wherein the object, the biconcave lens, and the biconvex lens are arranged in this order. The lens L9 is a single lens having a positive refractive power.

The following are various data on the objective 2.
NA=0.4, FN=26.5 mm, f=18 mm, WD=3.71 mm, |β|=10, $DOF_d$=1.83 μm, $F_{G1}$=9.92 mm, $F_{G2}$=88.91 mm, H=46.8341 mm, a=2.0941 mm, b=4.4914 mm The following are lens data of the objective 2. Note that surface numbers s3 and s17 respectively indicate the lens surface that is the closest to the object among the lens surfaces of the objective 2 and the lens surface that is the closest to the image among the lens surfaces of the objective 2.

| Objective 2 | | | | |
|---|---|---|---|---|
| s | r | d | nd | vd |
| 1 | ∞ | 0.17 | 1.52397 | 54.41 |
| 2 | ∞ | 3.714 | | |
| 3 | −8.3949 | 4.2261 | 1.61336 | 44.49 |
| 4 | 12.2083 | 3.4815 | 1.497 | 81.54 |
| 5 | −10.5622 | 0.2018 | | |
| 6 | 126.8294 | 2.8128 | 1.43875 | 94.66 |
| 7 | −18.6394 | 0.2048 | | |
| 8 | 14.7711 | 4.4917 | 1.43875 | 94.66 |
| 9 | −18.5105 | 1.6875 | | |
| 10 | 12.838 | 4.8105 | 1.43875 | 94.66 |
| 11 | −9.1271 | 4.4914 | 1.51633 | 64.14 |
| 12 | 7.2585 | 5.7127 | | |
| 13 | −5.2712 | 2.9004 | 1.51633 | 64.14 |
| 14 | 71.5741 | 4.1702 | 1.43875 | 94.66 |
| 15 | −10.1943 | 0.2273 | | |
| 16 | −195.0855 | 3.5314 | 1.43875 | 94.66 |
| 17 | −13.7625 | | | |

The following indicates, for the objective 2, an object height ratio Fiy, a d-line optimization position $W_z$, an RMS wavefront aberration $W_{CRMS}$ in a C line at the d-line optimization position, and an RMS wavefront aberration $W_{FRMS}$ in an F line at the d-line optimization position.

| Fiy  | Wz (Fiy) | WCRMS (Fiy) | WFRMS (Fiy) |
|------|----------|-------------|-------------|
| 0    | 0.00     | 0.034       | 0.067       |
| 0.05 | 0.01     | 0.034       | 0.067       |
| 0.1  | 0.03     | 0.033       | 0.067       |
| 0.15 | 0.07     | 0.033       | 0.067       |
| 0.2  | 0.12     | 0.032       | 0.067       |
| 0.25 | 0.19     | 0.032       | 0.067       |
| 0.3  | 0.27     | 0.031       | 0.067       |
| 0.35 | 0.36     | 0.030       | 0.067       |
| 0.4  | 0.46     | 0.030       | 0.065       |
| 0.45 | 0.57     | 0.031       | 0.064       |
| 0.5  | 0.69     | 0.034       | 0.061       |
| 0.55 | 0.81     | 0.038       | 0.058       |
| 0.6  | 0.94     | 0.045       | 0.053       |
| 0.65 | 1.06     | 0.055       | 0.047       |
| 0.7  | 1.19     | 0.067       | 0.042       |
| 0.75 | 1.31     |             |             |
| 0.8  | 1.45     |             |             |
| 0.85 | 1.59     |             |             |
| 0.9  | 1.76     |             |             |
| 0.95 | 1.93     |             |             |
| 1    | 2.12     |             |             |

As indicated in the following, the objective satisfies conditional expressions (1)-(11) and (13)-(15).

$(W_z(1) - W_z(0))/DOF_d = 2.12$ (1)

$Max(W_{CMRS}(Fiy)) = 0.067$ (2)

$Max(W_{FRMS}(Fiy)) = 0.067$ (3)

$Min(FCY(Fiy)/DOF_d) = 0.12$ $Max(FCY(Fiy)/DOF_d) = 3.26$ (4)

$Min((FCY_C(Fiy) - FCY_F(Fiy))/DOF_d) = -1.93$ $Max((FCY_C(Fiy) - FCY_F(Fiy))/DOF_d) = 0.99$ (5)

$Min(FCX(Fiy)/DOF_d) = 0.08$ $Max(FCX(Fiy)/DOF_d) = 2.20$ (6)

$Min((FCY(Fiy) + FCX(Fiy))/(2 \times DOF_d \times Fiy^2)) = 2.54$ $Max((FCY(Fiy) + FCX(Fiy))/(2 \times DOF_d \times Fiy^2)) = 2.73$ (7)

$Min(MTFm_{peak}(Fiy)/(DOF_d \times Fiy^2)) = 1.60$ $Max(MTFm_{peak}(Fiy)/(DOF_d \times Fiy^2)) = 2.69$ (8)

$ave(MTFm_{peakC}(Fiy) - MTFm_{peakF}(Fiy))/DOF_d = 0.46$ (9)

$Min(MTFs_{peak}(Fiy)/(DOF_d \times Fiy^2)) = 2.79$ $Max(MTFs_{peak}(Fiy)/(DOF_d \times Fiy^2)) = 3.08$ (10)

$R = -13.7625$ mm (11)

$NA = 0.4$ (13)

$H/f = 2.6$ (14)

$a/b = 0.47$ (15)

Figure 4:
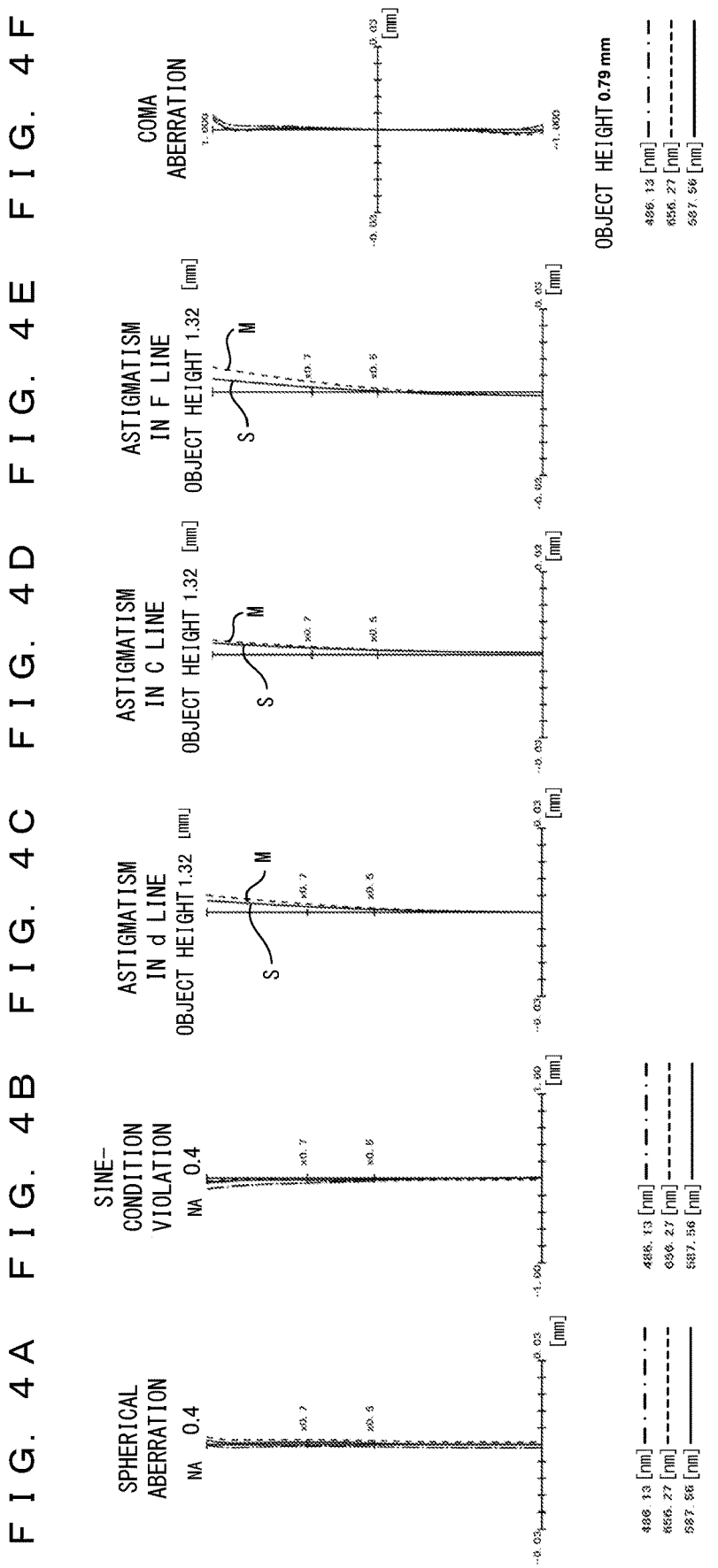
FIGS. 4A-4F are each an aberration diagram for the objective 2 depicted in FIG. 3.

FIGS. 4A-4F are each an aberration diagram for the objective 2 depicted in FIG. 3 and indicate aberrations that occur on an object surface when a pencil of infinitely distant light is incident from an image side. FIG. 4A is a spherical aberration diagram. FIG. 4B illustrates a sine-condition violation amount. FIG. 4C is an astigmatism diagram for a d line. FIG. 4D is an astigmatism diagram for a C line. FIG. 4E is an astigmatism diagram for an F line. FIG. 4F is a coma aberration diagram for a position with an object height ratio of 0.6 (object height 0.79 mm).

Third Embodiment

Figure 5:
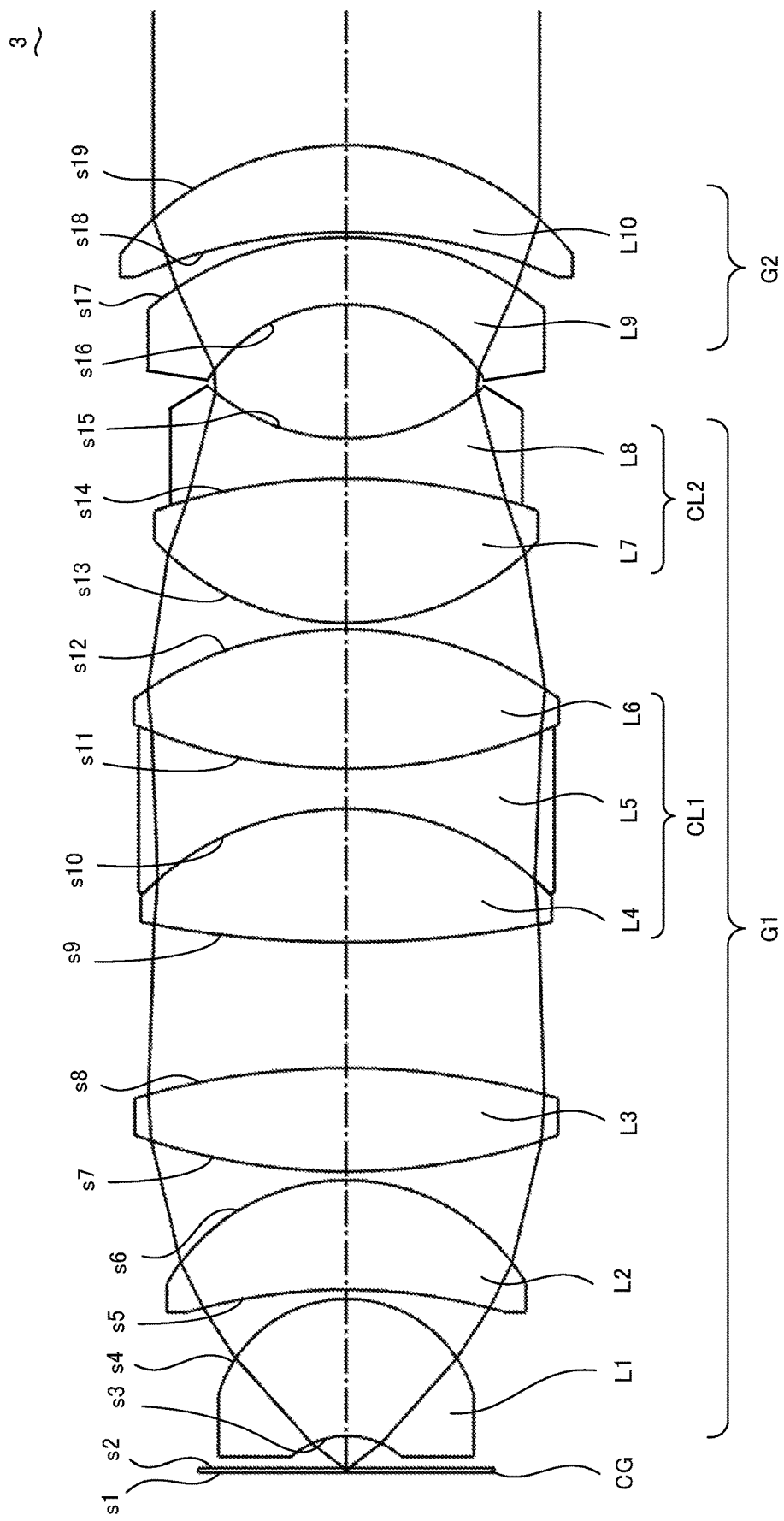
FIG. 5 is a cross-sectional view of an objective 3 in accordance with a third embodiment of the invention.

FIG. 5 is a cross-sectional view of an objective in accordance with the present embodiment. The objective 3 is a dry microscope objective and includes a first lens group G1 having a positive refractive power and a second lens group G2 having a positive refractive power, wherein an object, the first lens group G1, and the second lens group G2 are arranged in this order. The first lens group G1 and the second lens group G2 have concave surfaces adjacent to each other and facing each other.

The first lens group G1 includes a lens L1 that is a meniscus lens having a concave surface facing the object, a lens L2 that is a meniscus lens having a concave surface facing the object, a lens L3 that is a biconvex lens, a cemented lens CL1, and a cemented lens CL2 having a concave surface facing the image, wherein the object, the lens L1, the lens L2, the lens L3, the cemented lens CL1, and the cemented lens CL2 are arranged in this order. The cemented lens CL1 is a cemented triplet lens and consists of a biconvex lens (lens L4), a biconcave lens (lens L5), and a biconvex lens (lens L6), wherein the object, the biconvex lens (lens L4), the biconcave lens (lens L5), and the biconvex lens (lens L6) are arranged in this order. The cemented lens CL2 is a cemented doublet lens and consists of a biconvex lens (lens L7) and a biconcave lens (lens L8), wherein the object, the biconvex lens (lens L7), and the biconcave lens (lens L8) are arranged in this order.

The second lens group G2 includes a lens L9 that is meniscus lens having a concave surface facing the object and a lens L10 that is a meniscus lens having a concave surface facing the object, wherein the object, the lens L9, and the lens L10 are arranged in this order.

The following are various data on the objective 3.

NA=0.8, FN=26.5 mm, f=9 mm, WD=1.17 mm, |β|=20, $DOF_d$=0.46 μm, $F_{G1}$=5.95 mm, $F_{G2}$=114.85 mm, $hg_1$=4.920 mm, $hg_2$=6.312 mm, $gt_1$=2.4854 mm

The following are lens data of the objective 3. Note that surface numbers s3 and s19 respectively indicate the lens surface that is the closest to the object among the lens surfaces of the objective 3 and the lens surface that is the closest to the image among the lens surfaces of the objective 3.

| Objective 3 | | | | |
|---|---|---|---|---|
| s | r | d | nd | vd |
| 1 | ∞ | 0.17 | 1.52397 | 54.41 |
| 2 | ∞ | 1.17 | | |
| 3 | −3.1485 | 5.1142 | 1.603 | 65.44 |
| 4 | −4.9459 | 0.3439 | | |
| 5 | −21.3731 | 4.0708 | 1.43875 | 94.66 |
| 6 | −7.7412 | 0.3283 | | |
| 7 | 23.7065 | 3.8574 | 1.43875 | 94.93 |
| 8 | −28.081 | 4.6645 | | |
| 9 | 38.8862 | 4.9835 | 1.43875 | 94.93 |
| 10 | −10.6104 | 1.5 | 1.63775 | 42.41 |
| 11 | 20.0426 | 5.1722 | 1.43875 | 94.93 |

-continued

Objective 3

| s | r | d | nd | vd |
|---|---|---|---|---|
| 12 | −13.3781 | 0.2448 | | |
| 13 | 9.85 | 5.3638 | 1.43875 | 94.93 |
| 14 | −22.0444 | 1.5 | 1.63775 | 42.41 |
| 15 | 7.7482 | 5 | | |
| 16 | −6.1396 | 2.4854 | 1.58913 | 61.14 |
| 17 | −11.5747 | 0.1886 | | |
| 18 | −19.5016 | 3.2462 | 1.738 | 32.26 |
| 19 | −10.7423 | | | |

The following indicates, for the objective 3, an object height ratio Fiy, a d-line optimization position $W_z$, an RMS wavefront aberration $W_{CRMS}$ in a C line at the d-line optimization position, and an RMS wavefront aberration $W_{FRMS}$ in an F line at the d-line optimization position.

| Fiy | Wz (Fiy) | WCRMS (Fiy) | WFRMS (Fiy) |
|---|---|---|---|
| 0 | 0.00 | 0.023 | 0.048 |
| 0.05 | −0.01 | 0.023 | 0.049 |
| 0.1 | −0.02 | 0.022 | 0.051 |
| 0.15 | −0.04 | 0.021 | 0.054 |
| 0.2 | −0.06 | 0.021 | 0.059 |
| 0.25 | −0.09 | 0.020 | 0.064 |
| 0.3 | −0.12 | 0.021 | 0.072 |
| 0.35 | −0.14 | 0.023 | 0.080 |
| 0.4 | −0.15 | 0.027 | 0.089 |
| 0.45 | −0.16 | 0.032 | 0.101 |
| 0.5 | −0.16 | 0.040 | 0.115 |
| 0.55 | −0.14 | 0.049 | 0.130 |
| 0.6 | −0.10 | 0.060 | 0.148 |
| 0.65 | −0.03 | 0.073 | 0.170 |
| 0.7 | 0.06 | 0.089 | 0.195 |
| 0.75 | 0.19 | | |
| 0.8 | 0.34 | | |
| 0.85 | 0.55 | | |
| 0.9 | 0.80 | | |
| 0.95 | 1.09 | | |
| 1 | 1.44 | | |

As indicated in the following, the objective 3 satisfies conditional expressions (1)-(11), (13), and (16).

$$(W_z(1)-W_z(0))/DOF_d=1.44 \tag{1}$$

$$Max(W_{CRMS}(Fiy))=0.089 \tag{2}$$

$$Max(W_{FRMS}(Fiy))=0.195 \tag{3}$$

$$Min(FCY(Fiy)/DOF_d)=0.05$$

$$Max(FCY(Fiy)/DOF_d)=3.61 \tag{4}$$

$$Min((FCY_C(Fiy)-FCY_F(Fiy))/DOF_d)=-0.53 \tag{5}$$

$$Max((FCY_C(Fiy)-FCY_F(Fiy))/DOF_d)=0.25 \tag{5}$$

$$Min(FCX(Fiy)/DOF_d)=0.14$$

$$Max(FCX(Fiy)/DOF_d)=4.80 \tag{6}$$

$$Min((FCY(Fiy)+FCX(Fiy))/(2\times DOF_d \times Fiy^2))=2.49$$

$$Max((FCY(Fiy)+FCX(Fiy))/(2\times DOF_d \times Fiy^2))=4.20 \tag{7}$$

$$Min(MTFm_{peak}(Fiy)/(DOF_d \times Fiy^2))=-1.10$$

$$Max(MTFm_{peak}(Fiy)/(DOF_d \times Fiy^2))=2.35 \tag{8}$$

$$ave(MTFm_{peakC}(Fiy)-MTFm_{peakF}(Fiy))/DOF_d=-1.11 \tag{9}$$

$$Min(MTFs_{peak}(Fiy)/(DOF_d \times Fiy^2))=-1.08$$

$$Max(MTFs_{peak}(Fiy)/(DOF_d \times Fiy^2))=3.02 \tag{10}$$

$$R=-10.7423 \text{ mm} \tag{11}$$

$$NA=0.8 \tag{13}$$

$$(hg_2-hg_1)/gt_1=0.56 \tag{16}$$

FIGS. 6A-6F are each an aberration diagram for the objective 3 depicted in FIG. 5 and indicate aberrations that occur on an object surface when a pencil of infinitely distant light is incident from an image side. FIG. 6A is a spherical aberration diagram. FIG. 6B illustrates a sine-condition violation amount. FIG. 6C is an astigmatism diagram for a d line. FIG. 6D is an astigmatism diagram for a C line. FIG. 6E is an astigmatism diagram for an F line. FIG. 6F is a coma aberration diagram for a position with an object height ratio of 0.6 (object height 0.40 mm).

What is claimed is:

1. A dry microscope objective comprising:
   a first lens group having a positive refractive power; and
   a second lens group having a positive refractive power, wherein:
   an object, the first lens group, and the second lens group are arranged in this order,
   the dry microscope objective has a 20-fold magnification or lower,
   the first and second lens groups have concave surfaces adjacent to each other and facing each other, and
   the dry microscope objective satisfies the following conditional expressions:

$$1.4 \leq (W_z(1)-W_z(0))/DOF_d \leq 2.3 \tag{1}$$

$$0 \leq W_{CRMS}(Fiy) \leq 0.1\lambda_d \ (0 \leq Fiy \leq 0.7) \tag{2}$$

where $W_z$ indicates a function that depends on an object height ratio, an output of the function $W_z$ being a d-line optimization position that is a longitudinal position at which an RMS wavefront aberration in a d line at the object height ratio is minimized, $DOF_d$ indicates a depth of focus for the d line, $W_{CRMS}$ indicates a function that depends on the object height ratio, an output of the function $W_{CRMS}$ being an RMS wavefront aberration in a C line that occurs at the d-line optimization position, Fiy indicates the object height ratio, and $\lambda_d$ indicates a wavelength of the d line.

2. The dry microscope objective of claim 1, satisfying the following conditional expression:

$$0 \leq W_{FRMS}(Fiy) \leq 0.2\lambda_d \ (0 \leq Fiy \leq 0.7) \tag{3}$$

where $W_{FRMS}$ indicates a function that depends on the object height ratio, an output of the function $W_{FRMS}$ being an RMS wavefront aberration in an F line that occurs at the d-line optimization position.

3. The dry microscope objective of claim 2, satisfying the following conditional expressions:

$$0 \leq FCY(Fiy)/DOF_d \leq 5 \ (0.2 \leq Fiy \leq 1) \tag{4}$$

$$-3 \leq (FCY_C(Fiy)-FCY_F(Fiy))/DOF_d \leq 3 \tag{5}$$

where FCY indicates a function that depends on the object height ratio, an output of the function FCY being a field curvature in the d line that occurs on a meridional plane, $FCY_C$ indicates a function that depends on the object height ratio, an output of the function $FCY_C$ being a field curvature in the C line that occurs on the meridional plane, and $FCY_F$ indicates a function that depends on the object height ratio, an output of the function $FCY_F$ being a field curvature in an F line that occurs on the meridional plane.

4. The dry microscope objective of claim 3, satisfying the following conditional expression:

$$0 \le FCX(Fiy)/DOF_d \le 5 \quad (0.2 \le Fiy \le 1) \quad (6)$$

where FCX indicates a function that depends on the object height ratio, an output of the function FCX being a field curvature in the d line that occurs on a sagittal plane.

5. The dry microscope objective of claim 1, satisfying the following conditional expressions:

$$0 \le FCY(Fiy)/DOF_d \le 5 \quad (0.2 \le Fiy \le 1) \quad (4)$$

$$-3 \le (FCY_C(Fiy)-FCY_F(Fiy))/DOF_d \le 3 \quad (5)$$

where FCY indicates a function that depends on the object height ratio, an output of the function being a field curvature in the d line that occurs on a meridional plane, $FCY_C$ indicates a function that depends on the object height ratio, an output of the function being a field curvature in the C line that occurs on the meridional plane, and $FCY_F$ indicates a function that depends on the object height ratio, an output of the function being a field curvature in an F line that occurs on the meridional plane.

6. The dry microscope objective of claim 5, satisfying the following conditional expression:

$$0 \le FCX(Fiy)/DOF_d \le 5 \quad (0\ 0.2 \le Fiy \le 1) \quad (6)$$

where FCX indicates a function that depends on the object height ratio, an output of the function FCX being a field curvature in the d line that occurs on a sagittal plane.

7. The dry microscope objective of claim 5, satisfying the following conditional expression:

$$1 \le (FCY(Fiy)+FCX(Fiy))/(2 \times DOF_d \times Fiy^2) \le 5 \quad (0.2 \le Fiy \le 1) \quad (7)$$

where FCX indicates a function that depends on the object height ratio, an output of the function FCX being a field curvature in the d line that occurs on a sagittal plane.

8. The dry microscope objective of claim 1, satisfying the following conditional expressions:

$$-1.1 \le MTFm_{peak}(Fiy)/(DOF_d \times Fiy^2) \le 5 \quad (0\ 0.2 \le Fiy \le 1) \quad (8)$$

$$-1.2 \le ave(MTFm_{peakC}(Fiy)-MTFm_{peakF}(Fiy))/DOF_d \le 1.2 \quad (0 \le Fiy \le 0.8) \quad (9)$$

where $MTFm_{peak}$ indicates a function that depends on the object height ratio, an output of the function $MTFm_{peak}$ being a longitudinal position at which an MTF specific to the d line on a meridional plane is maximized, $MTFm_{peakC}$ indicates a function that depends on the object height ratio, an output of the function $MTFm_{peakC}$ being a longitudinal position at which an MTF specific to the C line on the meridional plane is maximized, $MTFm_{peakF}$ indicates a function that depends on the object height ratio, an output of the function $MTFm_{peakF}$ being a longitudinal position at which an MTF specific to an F line on the meridional plane is maximized, the MTF specific to the d line, the MTF specific to the C line, and the MTF specific to the F line are based on a reference spatial frequency that is a spatial frequency corresponding to an Airy disk radius, and ave indicates an averaging function.

9. The dry microscope objective of claim 8, satisfying the following conditional expression:

$$-1.1 \le MTFs_{peak}(Fiy)/(DOF_d \times Fiy^2) \le 5 \quad (0.2 \le Fiy \le 1) \quad (10)$$

where $MTFs_{peak}$ indicates a function that depends on the object height ratio, an output of the function $MTFs_{peak}$ being a longitudinal position at which an MTF specific to the d line on a sagittal plane is maximized, and the MTF specific to the d line is based on the reference spatial frequency.

10. The dry microscope objective of claim 1, wherein:
the second lens group includes a final lens that is closest to an image among lenses of the second lens group, the final lens being a single lens, and
the dry microscope objective satisfies the following conditional expression:

$$-15 \text{ mm} \le R \le -10 \text{ mm} \quad (11)$$

where R indicates a radius of curvature of a lens surface of an image side of the final lens.

11. The dry microscope objective of claim 10, further comprising:
three or more cemented lenses.

12. The dry microscope objective of claim 10, further comprising:
two or more cemented lenses,
wherein at least one of the two or more cemented lenses is a cemented triplet lens.

13. The dry microscope objective of claim 1, wherein:
the second lens group of the dry microscope objective includes:
at least one lens component that has a negative refractive power overall,
a first cemented lens, and
a single lens that has a positive refractive power,
the object, the at least one lens component, the first cemented lens, and the single lens are arranged in this order, and
an axial marginal light ray height is maximized at a lens surface that is closest to the image among lens surfaces of the dry microscope objective.

14. The dry microscope objective of claim 13, satisfying the following conditional expression:

$$-0.38 \le F_S/F_C \le 0.38 \quad (12)$$

where $F_C$ indicates a focal length that the first cemented lens has for the d line, and $F_S$ indicates a focal length that the single lens has for the d line.

15. The dry microscope objective of claim 1, wherein:
the first lens group includes:
a first cemented lens having a concave surface facing the object,
a first single lens having a positive refractive power, and
a second cemented lens having a concave surface facing the image,
the object, the first cemented lens, the first single lens, and the second cemented lens are arranged in this order,
the second lens group includes:
a third cemented lens having a concave surface facing the object, and
a second single lens having a positive refractive power,
the object, the third cemented lens, and the second single lens are arranged in this order, and
the first, second, and third cemented lenses are each a cemented doublet lens consisting of one positive lens and one negative lens.

16. The dry microscope objective of claim 15, satisfying the following conditional expressions:

$$0.31 \leq NA < 1 \quad (13)$$

$$2.2 \leq H/f \leq 3.3 \quad (14)$$

$$0 < a/b \leq 1.2 \quad (15)$$

where NA indicates a numerical aperture of an object side of the dry microscope objective, f indicates a focal length that the dry microscope objective has for the d line, H indicates a distance from an object surface to a lens surface that is closest to the image among lens surfaces of the second lens group, a indicates a total of air space distances in the first lens group, and b indicates a thickness of the negative lens included in the second cemented lens.

17. The dry microscope objective of claim 1, satisfying the following conditional expressions:

$$0.31 \leq NA < 1 \quad (13)$$

$$2.2 \leq H/f \leq 3.3 \quad (14)$$

where NA indicates a numerical aperture of an object side of the dry microscope objective, f indicates a focal length that the dry microscope objective has for the d line, H indicates a distance from an object surface to a lens surface that is closest to the image among lens surfaces of the second lens group.

18. The dry microscope objective of claim 1, satisfying the following conditional expression:

$$0.43 \leq (hg_2 - hg_1)/gt_1 \leq 1.5 \quad (16)$$

where $gt_1$ indicates a thickness that a lens component that is closest to the object among components of the second lens group has on an optical axis, $hg_1$ indicates an axial marginal light ray height at a lens surface that is closest to the object among lens surfaces of the lens component, and $hg_2$ indicates an axial marginal light ray height at a lens surface that is closest to the image among the lens surfaces of the lens component.

19. A dry microscope objective comprising:
a first lens group having a positive refractive power; and
a second lens group having a positive refractive power, wherein:
an object, the first lens group, and the second lens group are arranged in this order,
the dry microscope objective has a 20-fold magnification or lower,
the first and second lens groups have concave surfaces adjacent to each other and facing each other, and the dry microscope objective satisfies the following conditional expressions:

$$0 \leq FCY(Fiy)/DOF_d \leq 5 \quad (0.2 \leq Fiy \leq 1) \quad (4)$$

$$-3 \leq (FCY_C(Fiy) - FCY_F(Fiy))/DOF_d \leq 3 \quad (5)$$

where FCY indicates a function that depends on an object height ratio, an output of the function FCY being a field curvature in a d line that occurs on a meridional plane, $FCY_C$ indicates a function that depends on the object height ratio, an output of the function $FCY_C$ being a field curvature in a C line that occurs on the meridional plane, $FCY_F$ indicates a function that depends on the object height ratio, an output of the function $FCY_F$ being a field curvature in an F line that occurs on the meridional plane, $DOF_d$ indicates a depth of focus for the d line, and Fiy indicates the object height ratio.

20. A dry microscope objective comprising:
a first lens group having a positive refractive power; and
a second lens group having a positive refractive power, wherein:
an object, the first lens group, and the second lens group are arranged in this order,
the dry microscope objective has a 20-fold magnification or lower,
the first and second lens groups have concave surfaces adjacent to each other and facing each other, and
the dry microscope objective satisfies the following conditional expressions:

$$-1.1 \leq MTFm_{peak}(Fiy)/(DOF_d \times Fiy^2) \leq 5 \quad (0.2 \leq Fiy \leq 1) \quad (8)$$

$$-1.2 \leq ave(MTFm_{peakC}(Fiy) - MTFm_{peakF}(Fiy))/DOF_d \leq 1.2 \quad (0 \leq Fiy \leq 0.8) \quad (9)$$

where $MTFm_{peak}$ indicates a function that depends on the object height ratio, an output of the function $MTFm_{peak}$ being a longitudinal position at which an MTF specific to the d line on a meridional plane is maximized, $DOF_d$ indicates a depth of focus for the d line, Fiy indicates the object height ratio, $MTFm_{peakC}$ indicates a function that depends on the object height ratio, an output of the function $MTFm_{peakC}$ being a longitudinal position at which an MTF specific to a C line on the meridional plane is maximized, $MTFm_{peakF}$ indicates a function that depends on the object height ratio, an output of the function $MTFm_{peakF}$ being a longitudinal position at which an MTF specific to an F line on the meridional plane is maximized, the MTF specific to the d line, the MTF specific to the C line, and the MTF specific to the F line are based on a reference spatial frequency that is a spatial frequency corresponding to an Airy disk radius, and ave indicates an averaging function.

* * * * *